United States Patent [19]

Jones

[11] 4,136,714

[45] Jan. 30, 1979

[54] ACCUMULATOR DRAIN CLOSURE

[75] Inventor: David W. Jones, East Northport, N.Y.

[73] Assignee: Creavco, Inc., New York, N.Y.

[21] Appl. No.: 754,552

[22] Filed: Dec. 27, 1976

[51] Int. Cl.² ............................................ F16L 55/04

[52] U.S. Cl. ...................................... 138/30; 239/89; 239/96

[58] Field of Search ...................... 138/30; 239/86, 89

[56] References Cited

U.S. PATENT DOCUMENTS

| | | | |
|---|---|---|---|
| 2,345,124 | 3/1944 | Huber | 138/30 |
| 2,731,038 | 1/1956 | Purcell | 138/30 |

*Primary Examiner*—William D. Martin, Jr.
*Attorney, Agent, or Firm*—Philip Furgang

[57] ABSTRACT

A closure is provided for an accumulator. The closure comprises a drain housing, a spring within the drain housing, and hollow cup-like piston within the drain housing, which is urged into an open position by the spring. With the piston in a closed position, the accumulator port is closed and blocks the bladder from entering the drain. The piston has substantially elliptical drain holes in its cylindrical side wall. With the piston in an open condition, the drain holes extend from within the accumulator housing to within the drain housing. The wall which defines the opening of each drain hole, at the portion adjacent to the closed joint of the piston, is canted so that a vector of the forces attributable to liquids leaving the accumulator is directed against the piston to aid in keeping it open. The spring is a coiled spring, so dimensioned as to be proximate the drain housing wall so as to be removed from the flow of the stored substance as it enters and leaves the accumulator. Further, the spring abuts the piston at the end of the piston which is well within the drainage housing. The diametrcal spacing between the piston and drain housing is such as to permit the stored substances to leave the accumulator with the piston in a closed position.

23 Claims, 3 Drawing Figures

ACCUMULATOR DRAIN CLOSURE

BACKGROUND OF THE INVENTION

This invention pertains to drain closures and, more particularly, to drain closures of the type used in connection with accumulators.

There are various types of accumulators. One common type of accumulator has a rigid container with a flexible and expansible bladder therein. The bladder may be filled with a compressible fluid, such as a gas. Air or any inert gas may be used. The bladder is usually pressurized through approximately one half the total system pressure.

Outside the bladder, and within the rigid accumulator chamber, a substance is stored which is, relative to the gas, non-compressible. This substance, which is often an oil or another liquid used in hydraulics, is stored within the accumulator at a higher pressure. As such, the compressible gas may be compressed by the relatively non-compressible oil until the pressures in the accumulator are equalized. Upon the demand of the system to which the accumulator is attached, the stored energy in the bladder will force the stored non-compressible oil through the accumulator drain until, ideally, all the oil has been expelled from the accumulator. Thus, energy stored within the compressed bladder causes the bladder to expand until it completely fills the chamber. The expanding bladder depresses a drain closure. Unless the drain closure remains open until substantially all of the stored oil in the accumulator is expelled, some of the oil will be trapped and not be available for useful purposes within the system to which the accumulator is attached. In addition, where the bladder, upon expanding, extrudes past the drain closure, it is likely to become pinched or torn and eventually fail, thereby making the accumulator inoperative. This is a substantial problem and one which has plagued the operation of prior art accumulators.

To retain the drain closure open so that substantially all of the stored oil may be expelled from the accumulator, a relatively strong spring is used to bias open the valve closure. However, the spring cannot be so strong as to keep the closure open so that the bladder extrudes past the drain closure head, with the above-indicated resulting injury.

If, on the other hand, a relatively weak spring is used to insure that the drain closure closes before the bladder can be extruded, the force of the bladder immediately overcomes the force of the spring and closes the drain closure while the accumulator is still charged with a considerable quantity of the stored oil. Furthermore, in the event a large rate of flow of the stored oil is required during any short period of time, such as, for example, in the operation of a hydraulic brake, the flow of such fluid would result in a low pressure area beneath the drain closure and a high pressure area within the accumulator chamber. As a result, a relatively weak spring would not be able to overcome the differential pressure on both sides of the closure head and the latter may close almost immediately after the flow of the stored oil begins.

There have been a number of approaches to providing an efficient drain closure. Thus, Mercier, in U.S. Pat. No. 2,932,320, provides a valve in which a generally cylindrical drain has a hollow piston slidable secured therein. A leaf spring is within the drain housing and bears against the side walls thereof, and is secured within the piston centrally to the piston top. Circular holes are in the cylindrical side walls of the hollow piston to permit the stored oil to enter and leave the accumulator chamber through the drain. The valve member provided by Mercier is characterized by having a lip which overhangs the accumulator port, so as to seal the drain shut.

Mercier, in U.S. Pat. No. Re. 23,333, proposes another valve construction for an accumulator, in which the hollow piston is centrally supported by a coil spring. As with the device first proposed by Mercier U.S. Pat. No. 2,932,320), substances entering or leaving the accumulator chamber will pass directly about the spring. Like that first Mercier device, the apertures in the side of the piston are generally circular in configuration and extend radially with respect to the cylindrical piston.

Berger, in U.S. Pat. No. 2,659,391, suggests a hollow cylindrical valve stem in a drain valve. The valve stem portion of the valve head has an overhanging lip which engages and seals shut the accumulator drain port. The spring in this instance is a cylindrical spring coiled about the outside of the valve stem and bears against the overhanging lip.

Still another device is offered by EMG Hydraulics, Inc. of Santa Monica, California, in which a poppet valve is disclosed. A solid valve stem supports a valve head which is chamferred so as to fit into registry with the accumulator port inside the accumulator housing. A coiled spring is about the stem of the poppet and resiliently pushes the head upwardly.

Most of the aforementioned devices have a common misinterpretation of the purpose of the accumulator drain closure. In each instance, the devices proposed are valves and the valve closures proposed are intended to seal shut the opening once the bladder has pressed the closure shut. Because of the emphasis upon tight sealing, the overhanging lip of the devices proposed by Berger and Mercier (U.S. Pat. No. 2,932,320), as well as the engaging edges of the EMG Hydraulics, Inc. device, tend to catch or engage the bladder and damage it. All the devices have in common the fact that the spring used to urge the closure into an open position are directly in the flow of the stored material. It is believed that the impingement of such material upon the spring will have a detrimental effect. It may vary the spring's resiliency in response to the flow-rate, direction of flow, and viscosity of the stored substance.

In the discussed devices, the springs bear against the underside of the closure top because the center support provided by the spring (e.g. Mercier in U.S. Pat. No. Re. 23,333), the diametral clearance between the housing and valve must be snug in order to avoid having the valve pivot in the housing and scar the housing wall. This requirement further blocks the flow of stored substances from the accumulator once the port is closed by the valve.

The valve drain holes in hollow valves tend to be small and circular. Liquids flowing from the accumulator chamber and into the drain are required to change direction sharply thereby reducing pressure in the valve. The increased pressure differential between the valve and the accumulator may cause premature closing of the valve. A similar defect may be seen in the EMG device in which a member is inserted in the drain for supporting the centrally located spring and poppet valve. The liquid flow area is sharply constricted to thereby increase the pressure differential.

Prior art closure valve-type devices have proven to be inefficient, tending to prematurely close and entrapping the stored medium and, in some designs, capturing and damaging the bladder.

SUMMARY OF THE INVENTION

It is an object of this invention to provide a drain closure, for the drain of a pressure accumulator, which will comprise a few sturdy parts that may be readily assembled and are not likely to become out of order.

It is a further object of this invention to provide a drain closure which will remain open until substantially all of the medium stored in the accumulator is expelled therefrom, even with profuse and rapid discharge therefrom.

It is still another object of this invention to provide a closure for an accumulator drain which will close before the bladder becomes entrapped within the drain.

It is another object of this device to provide a resilient means for use in a drain closure which, although biasing the closure member into an open condition, is withdrawn from the flow path of the stored medium.

In accordance with the teachings of this invention, there is provided a closure device for use in an accumulator. The accumulator may be of a type which has a bladder therein and is used to store substances. The closure device comprises a drain housing having a port through which the substances pass. A hollow closure member is disposed in combination with the drain housing and has a closed position for closing the accumulator port. The closure member is slidable with respect to the housing to an open condition. The member is hollow and has apertures therein. The apertures permit the substances to enter and leave the accumulator through the member. At least one of the aperture walls of the member is disposed at an angle to the path the medium defines as it leaves the accumulator. Upon resolution of the forces imparted by the medium as it leaves the accumulator, one vector thereof impinges upon the wall substantially in the direction of the member moving from the closed position to the open condition. This force assists in holding the member in an open condition while the substances are leaving the accumulator. Resilient means are also provided in the housing and abut the member to yieldably hold the member in an open condition.

In another aspect of this invention, a closure device is designed for use in an accumulator of the type that stores substances and has a bladder therein. The closure device comprises a drain housing having an accumulator port. A drain closure member is provided in combination with the housing. The member in the closed position closes the accumulator port, thereby preventing the bladder from entering the housing. The closure member has a non-closed condition. Substances enter and leave the accumulator through the drain housing by a predetermined path. There is provided resilient means within the housing for yieldably urging the member into the non-closed position. The resilient means is so disposed within the housing so as to be spaced from the predetermined path.

In still another aspect of the invention, there is provided a closure device for use in an accumulator of the type having a bladder therein and which stores substances. The closure device includes a drain housing having an accumulator port within the accumulator. An accumulator port closure member is provided and extends from within the housing and through the accumulator port so as to, in one position, close the port to the bladder and, in another position, being extended from within the drain housing and without the accumulator port. The closure member has at least at one end thereof terminating within the housing. There is also provided resilient means within the housing for resiliently urging the member into an open position. The resilient means abuts the member substantially at the end which is within the housing.

DESCRIPTION OF THE PREFERRED EMBODIMENT

Prior art devices appear to have been based upon the premise that the closure for an accumulator drain is a valve which, upon closure, should seal off the accumulator chamber so as to prevent the flow of a stored medium. Actually, a moment's consideration of the function of an accumulator will reveal that this premise is incorrect. An accumulator, particularly the bladder type accumulator, stores a substance — usually such a substance as oil or the like — within a rigid accumulator chamber. A bladder within the accumulator chamber is inflated with a compressible gas. There is thus set an exchange of forces and stored forces, whereby the oil entering through the accumulator port presses upon the bladder, compressing the gas therein. When equalibrium is established, no further oil can enter the accumulator chamber.

The accumulator is part of an overall system. When the pressure of the system drops, the pressure in the bladder will, therefore, become, by comparison, larger than the pressure of the oil in the accumulator. As the presence of the system continues to drop, the bladder will expand within the accumulator chamber until it has forced out most of the oil or, as in most prior art devices, prematurely closes the drain closure or drain valve. Thus, it will be seen that the storage of the oil actually occurs with the drain closure in an open condition. When the drain closure is closed, its essential purpose is to inhibit or prevent the bladder from extruding into the drain or being grasped and pinched by the drain closure. At the same time, when the bladder does extend so as to force the stored oil from the accumulator chamber, it is absolutely desirable to remove as much of the stored oil as possible prior to the closure closing, thereby blocking the bladder from entering the drain. Thus, there exists two contradictory requirements: to prevent the bladder from entering the drain and, at the same time, to remove as much of the stored oil as possible.

Figure 1:
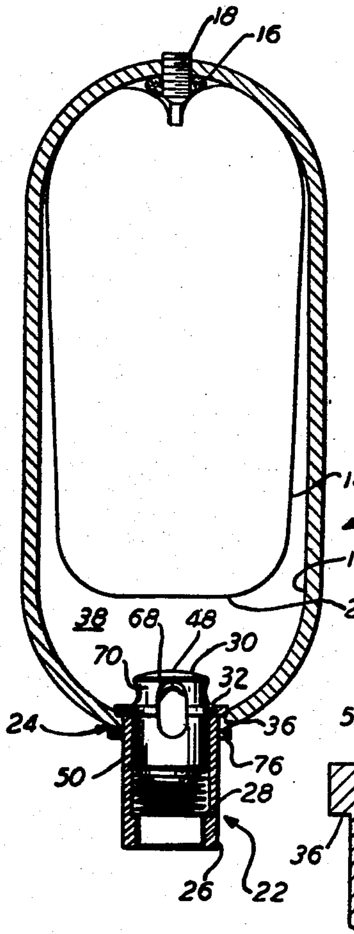
FIG. 1 is a partially sectioned view of the drain closure as constructed in accordance with the teachings of this invention.

Turning now to the drawing, there is disclosed a typical rigid accumulator 10 (FIG. 1) which has a generally cylindrical shape and defines therein an accumulator chamber 12. Within the accumulator chamber 12 may be a bladder 14, having a construction well known in the art. The bladder 14 may be simply attached to the accumulator 10 at a point 16. The bladder 14 is expansible or compressible under the pressure of the stored substance which, as indicated above, is generally oil or the like.

It will be understood that there is, necessarily, a generally compressible medium, such as gas, in the bladder 14 and a medium which is relative to the compressible medium, incompressible in the chamber 12. For convenience, and not as a limitation, the compressible medium is generally referred to hereinafter as "nitrogen" and the incompressible medium hereinabove and hereinafter as "oil". Other substances may suggest themselves for use in such a device.

Figure 2:
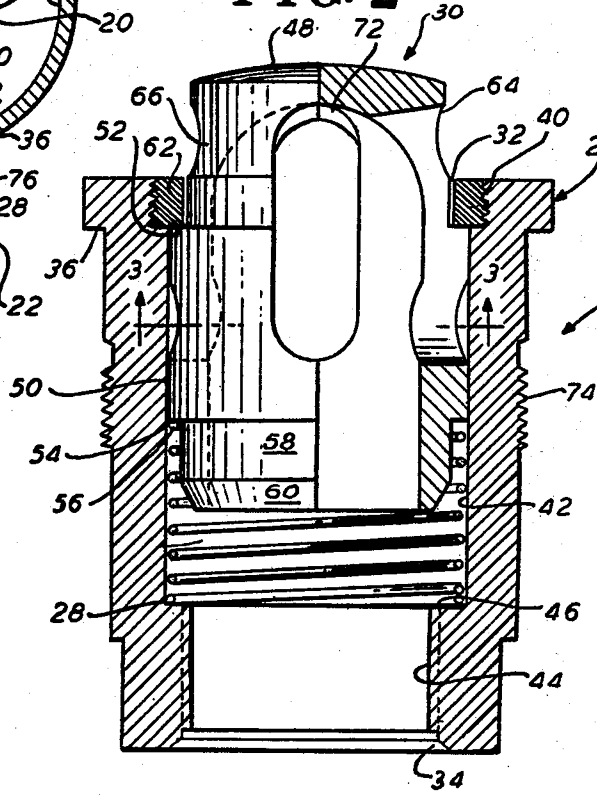
FIG. 2 is an enlarged sectional view of the drain closure of FIG. 1.

In the illustrated embodiment of the present invention, which offers particular advantages by reason of its simple construction, the bladder 14 is secured, as indicated, at its upper end at 16 within the accumulator chamber 12 and is fitted at this point 16 with a valve 18 for filling the bladder 14 with nitrogen under pressure. The lower end 20 of the bladder 14 is free within the accumulator 10. An accumulator closure device 22 (FIGS. 1 and 2) is shown at the base 24 of the accumulator chamber 12.

The closure device 22 generally comprises a drain housing 26. Within the drain housing is a resilient means 28. A closure member 30, for closing an accumulator port 32, is within the housing 26. The resilient means 28 is within the drain housing 26 and biases the closure member 30 upwardly and through the accumulator port 32 in the drain housing 26.

The drain housing 26 may be made of any structural material such as steel, cast aluminum, or the like. Preferably, the drain housing 26 (FIG. 2) is hollow and may have a generally cylindrical shape, with accumulator and line ports 32 and 34, respectively, at opposed ends. At the accumulator port end 32 of the housing 26, there may be provided a radially extending flange 36. This flange 36 is employed to engage the inner surface 38 of the accumulator chamber 12, as will be more fully seen hereinafter.

The interior portion of the housing 26 may comprise a plurality of cylindrically shaped juxtaposed portions which proceed coaxially and stepwise from the widest opening at the accumulator port 32 down to a smaller diameter line port end 34. The widest opening 40 of the accumulator port 32 may be threaded and extend for a fraction of the overall length of the housing 26. Thus, for example, where the axial length of the housing 26 is 4.38 inches, the axial length of the widest opening 40 may be 0.375 inches and have a diameter of 2 and $\frac{5}{8}$ inches.

The next portion 42 forms that part of the housing 26 which retains the resilient means 28 and a substantial part of the closure member 30. The diameter may be somewhat shorter and occupy a substantial part of the axial length of the drain 26. For example, the diameter of this portion 42 may be 2.28 inches and the axial length may be 4 inches. The purpose of the main part 42 of the housing 26 will be discussed hereinafter. (All dimensions provided herein are for illustrative purposes only.)

The final narrowed dimensioned portion 44 comprises a fitting to be secured at the line port 34. The step 46 to this part 44 is defined by a radially extending shelf 46. Thus, the fitting end 44 may have, for example; a diameter of $1\frac{7}{8}$ inches and a length of approximately 1.67 inches.

The resilient means 28, which may be, for example, a coiled cylindrical spring, may be disposed within the central portion 42 of the drain housing 26 and so dimensioned as to rest upon the step 46. Preferably, the spring 28 is so dimensioned as to conform to the cylindrical wall which defines the central part 42 of the drain housing 26. The spring 28 may extend upwardly approximately half the length of the central part 42.

The closure member 30 may be, for example, a generally cylindrical cup-like member, with its closed end 48 so disposed as to be within the accumulator chamber 12. This closure member or piston 30 may have a generally cylindrical configuration with an enlarged collar 40 substantially about the middle thereof. The piston 30 may be made of any rigid material, such as aluminum or the like. The collar 50 is defined by radially extending surfaces at the top 52 and bottom 54. These surfaces 52 and 54, respectively, intersect the cylindrical surface of the remainder of the piston 30. The bottom radial portion 54 is so dimensioned as to engage the top 56 of the spring 28. The lower cylindrical portion 58 of the piston 30 is so dimensioned as to fit within the spring 48. Preferably, the base thereof 58 may have a chamfer 60 to aid in the disposing of the piston 30 within the spring 28.

A retaining ring 62 may be threaded into the accumulator port 32. The retaining ring 62, upon being threaded into the housing 26 at the uppermost part 40, thereby narrows the opening and the extending edge thereof engages the top radial surface 52 of the collar 50 of the piston 30, to thereby retain the piston 30 and spring 28 within the drain housing 26.

In the example provided herein, the piston collar 50 may have an overall diameter of 2.275 inches and the narrower portions 66 and 58 above and below the collar 50 have a diameter of approximately 2 inches.

Figure 3:
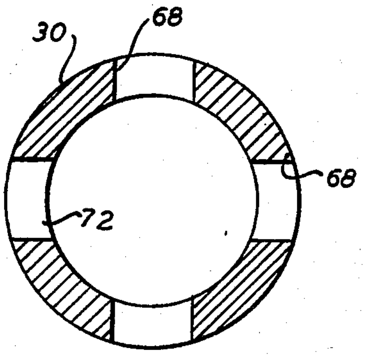
FIG. 3 is a sectional view of the piston of FIG. 2 taken along lines 3—3 and looking in the direction of the arrows.

As previously indicated, the piston 30 is hollow. It is also provided with a series of apertures 68 or openings within the cylindrical side wall 70 thereof so as to permit the stored oil (not shown) to enter and leave the accumulator chamber 12. These apertures 68 may, preferably, take the form of substantially eliptical openings, with the major axes being parallel to the axis of the piston 30. Preferably, there are four apertures, symmetrically disposed about the piston 30 (FIG. 3). The top wall 72 of each aperture 68 may be canted at an angle with respect to the radii of the piston 30. This angle could be, for example, at approximately 9°. The function of this angulation of the top wall 72 of each aperture 68 will be more fully discussed below.

It will be immediately seen that, with the piston 30 in its fully opened position (FIGS. 1 and 2), the apertures 68 extend from within the accumulator chamber 12 to within the housing 26. The purpose of this will be more fully discussed hereinafter.

It will be noted that the narrower top portion 66 of the piston 30 is substantially longer than the narrower bottom portion 58. In the example provided herein, with the piston approximately 3.31 inches long, the top portion 86 may have a length of 1.125 inches and the bottom portion a length of approximately 0.69 inches.

In assembly, the assembled drain housing 26, with the spring 28, piston 30, and retaining ring 62 in place, may be disposed with the flange portion 36 against the inner surface 38 of the accumulator chamber 12. A selected outer portion 74 of the housing 26 may be threaded. A retaining ring 76 (FIG. 1) may be threaded about the threaded portion 74 and against the accumulator housing 12 so as to secure the drain housing 26 in place.

In operation, it will be immediately apparent that the spring 28 urges the piston 30 from almost the base thereof, exerting pressure at the lower radial wall 54 of the collar 50. This is a substantial advantage over prior art devices in which the spring extended to the closure top. It is axiomatic that the shorter the spring travel, the longer will be the life of the spring. In addition, it will be noted that the spring 28 is disposed along the outer wall of the widest portion 42 of the drain housing (with the retaining ring in place). Thus, as oil enters and leaves the drain housing 26 and through the apertures 68 of the piston 30, the oil does not come into contact with the spring 28. This keeps the spring 28 clear of the effects of such substances. This has two beneficial effects: first, the reduced movement of the spring will, it is believed, increase its life. Second, the stored oil will not pass about the spring. As a result, the resiliency of the spring is, under all operating conditions, fully predictable. It will also be noted that the juncture of the side wall 70 with the closed end 48 of the piston 30 has no overhanging lip at the accumulator port 32. This permits the piston 39 to close and not engage the bladder 14. The apertures 68 are set below the piston top 48, thereby preventing the bladder 14 from being grasped and extruded into the drain housing 26 as the piston 30 closes.

Still another important feature of this invention is the canted wall opening 72. If the stored oil were to stream out of the accumulator chamber 12 through circular piston openings, as is commonly known in the art, the sudden change in the direction of the flow would cause a pressure drop within the hollow piston 30. This drop in pressure would, it is believed, cause the bladder 14 to close the piston 30 at an earlier point in time and trap oil inside the accumulator. It is desirable, however, to keep the piston 30 open for as long as possible until every remaining bit of stored oil is removed. By canting the top wall 72 of the apertures 68, the flow of oil out of the accumulator chamber 12 impinges upon the wall 72 to develop a vector force upward in a direction urged by the spring 28. This aids the spring 28 in maintaining the piston 20 in an open condition for a longer period of time than heretofore. Further, by maintaining the drain apertures 68 both below and above the accumulator post 32, there is maximized the drain opening area so that the flow of oil cannot impinge upon the lower wall of the opening. As a result, the pressure differential is small by comparison with the prior art devices discussed hereinabove.

Another important feature of this invention is the diametral clearance between the piston 30 and the housing 26. This clearance, which may be of the order of 15 thousandths of an inch, permits the flow of oil from the accumulator chamber 12 with the piston 30 in a closed position. This clearance is made possible by the fact that the spring bearing surface is upon the collar 50 at the outer surface of the piston 30. This should be compared with such devices as the one proposed by Merceir in U.S. Pat. No. Re. 32,333. Merceir calls for premature closing of his valve. In order to remove traped oil, he provides for small drain holes from within the housing and then to the valve. The present invention provides for larger drain holes, direct flow between the housing and the piston, and timed closing of the piston to thereby insure not only the complete removal of all stored oil by the expanding bladder, but at a rate which, it is believed, has not been heretofore experienced. Thus, the difference, as pointed out above, is that of a closure to the bladder, but not a valve — as provided in prior art devices.

What is claimed is:

1. A closure device for an accumulator, the accumulator being of the type which stores substances and having an accumulator port through which the substances pass into and out of the accumulator in a predetermined path and a bladder therein for pushing the stored substances through the drain opening, the bladder coming into contact with the opening, said device comprising:

(a) a drain housing defining the accumulator port;

(b) a drain closure member substantially within and movable with respect to said housing, said member having closed and open positions, said member in said closed position closing said accumulator port so as to prevent the bladder from entering said accumulator port;

(c) resilient means within said housing for yieldably urging said member into said open position, said resilient means being so disposed as to be spaced from the predetermined path; and (d) stop means within said housing for retaining said resilient means and said member within said housing accumulator port.

2. A closure device as recited in claim 1, wherein said resilient means abuts said member substantially at the end of said member within said housing.

3. A closure device as recited in claim 2, wherein said resilient means is a spring within said housing, said member comprising a cup-like member slidably secured within said housing, the cup bottom being disposed so as to close said accumulator port with said member fully within said housing, said spring pressing against said housing and being disposed against said member substantially proximate to the open marginal edge of said the cup.

4. A closure device as recited in claim 3, wherein said housing having a wall being substantially complementary with the side wall of said cup, said accumulator port having a marginal edge defining the port opening within the accumulator; upon said member being in said closed position, said cup botton being substantially continuous with said accumulator port marginal edge so as to prevent grasping or pinching the bladder upon closing.

5. A closure device as recited in claim 3, wherein said cup side wall having drain holes therethrough, such that the substances enter and leave the accumulator therethrough said port and said member in the predetermined path.

6. A closure device as recited in claim 5, wherein at least part of said member wall defining said drain holes being canted with repect to said side wall such that the substances upon leaving said accumulator impart a force against said canted wall so as to urge said member into said open position.

7. A closure device, as recited in claim 6, wherein said drain holes have a generally elliptical shape which, with said member in a fully open position, extend from within said accumulator to within said drain housing.

8. A closure device, as recited in claim 7, wherein said canted portion of said drain holes is proximate to said cup bottom wall.

9. A closure device, as recited in claim 8, wherein said spring engages said member at said cup side wall.

10. A closure device, as recited in claim 9, wherein said accumulator port having a marginal edge within the accumulator for defining the port opening, said cup bottom, in combination with said marginal edge of said accumulator port, forms a substantially continuous surface to thereby substantially inhibit the extrusion or pinching of the bladder between said member and said housing.

11. A closure device, as recited in claim 10, wherein said member further comprises collar means about said cup side wall, said collar means being within said housing, said spring engaging said collar, means said collar means engaging said stop means so as to prevent said member from being urged out of said housing by said spring.

12. A closure device, as recited in claim 11, wherein said housing having a generally cylindrical shape, said cup-like member being a generally cylindrical hollow piston, said piston substantially complementing said housing cylindrical wall, said collar means being an integrally formed collar extending from said piston, said collar being cylindrical and disposed substantially adjacent to said open marginal edge of said piston; said drain holes extending through said cylindrical side wall of said piston; said spring being a coil spring and complementing said cylindrical wall of said housing and being adapted to receive therewithin the part of said piston side wall between said collar and said open marginal edge of said piston; said collar being defined by two walls which extend radially with respect to the cylindrical axis of said piston; said spring abutting one of said two radial collar walls; said housing having a system port opposed to said accumulator port; said system port being adapted for being secured to an external system; said system port being defined by a wall of said housing extending radially inwardly; said spring abutting said radial wall of said housing which defines said system port; said stop means comprises said system port radial wall and a retaining ring; said accumulator port receiving therein and having secured thereto said retaining ring, said ring engaging said second of said two radial collar walls to thereby retain said piston and said spring within said housing; said canted wall of said piston aperture being disposed at an acute angle with respect to the plane defined by a radius extending from the axis of said cylindrically shaped housing.

13. A closure device, as recited in claim 12, wherein said side wall of said piston being substantially complementary with said retaining ring such that, upon said piston being in said closed position, said piston bottom being substantially continuous with said accumulator port marginal edge so as to prevent grasping or pinching the bladder upon closing.

14. A closure device as recited in claim 13, wherein there are four of said drain holes symmetrically disposed about said piston.

15. A closure device for use in an accumulator of the type which stores substances, the accumulator being of the type which has a bladder which is extendable to the accumulator port through which the substances pass into and out of the accumulator, said device comprising:

(a) a drain housing for defining the accumulator port;

(b) a hollow closure member within and in combination with said housing and having a closed position for closing the accumulator port, said closure member being slidable with respect to said housing said closure member having an open condition with respect to said accumulator port; said member being hollow and having apertures therein for permitting the substances to enter and leave the accumulator and through said member and said housing in a predetermined path; at least one wall portion of said closure member defining said aperture, said wall portion being disposed at an angle with respect to said path such that the substances leaving the accumulator impart a force against said wall portion so as to urge said closure member into said open condition;

(c) resilient means within said housing and abutting said closure member for yieldably urging said closure member into said open condition; and (d) stop means for retaining said closure member and said resilient means within said housing.

16. A closure device, as recited in claim 15, wherein said resilient means being disposed so as to be spaced from said predetermined path.

17. A closure device, as recited in claim 16, wherein said resilient means abuts said member substantially at an end thereof and within said housing.

18. A closure device, as recited in claim 17, wherein said port having a marginal edge within said accumulator for defining the port opening, said member comprises a cup-like piston with said piston being in said closed position, the cup bottom thereof, in combination with said marginal edge of said accumulator port, forms a substantially continuous closure surface so as to substantially inhibit the grasping and extruding of the bladder between said piston and said housing; and said piston in said open position extending from said housing and into the accumulator.

19. A closure device, as recited in claim 15, wherein said port having a marginal edge within said accumulator for defining the port opening, said closure member comprises a cuplike piston, said piston being within said housing and in said closed position having the cup bottom in combination with said marginal edge to thereby form a substantially continuous closure surface so as to substantially inhibit the grasping and extruding of the bladder between said piston and said housing.

20. A closure device for use in an accumulator, the accumulator being of the type for storing liquids under pressure and having a bladder therein which extends within the accumulator to contact the accumulator port, said device comprising:

(a) a drain housing for defining the accumulator port through which the liquids pass into and out of the accumulator;

(b) a member within said housing having a first and second position; in said first position said member closing said accumulator port; said member in combination with said housing substantially preventing the bladder from entering said drain port; the accumulator and said member in said closed position being so spaced from said housing to permit the liquids to pass therebetween in said closed position; said member, in said second position, being within said housing and extending without said housing and into the accumulator;

(c) resilient means within said housing and engaging said member for moving said member with respect to said housing from said first closed position to said second position; and (d) retaining means for retaining said resilient means and said closing member within said housing.

21. A closure device as recited in claim 20 wherein said closing member comprises a hollow, cup-like member having drain holes in the cup wall thereof.

22. A closure device for use in an accumulator, the accumulator being of the type which has a bladder therein and stores substances, said device comprising:

(a) a drain housing having an accumulator port within the accumulator for permitting the substances to enter and leave the accumulator;

(b) an accumulator port closure member extending within said drain housing and through said accumulator port so as to, in one position, close said accumulator port and be fully within said housing, and, in another position, extend from within said drain housing, without said accumulator port, and into the accumulator;

(c) resilient means within said housing for resiliently urging said member into said open position from said closed position, said resilient means engaging said member substantially at the end thereof within said housing; and (d) means, in combination with said housing, for retaining said member and said resilient means within said housing.

23. A closure device as recited in claim 22 wherein the substances pass through said drain housing port in a predetermined path, said resilient means being disposed so as to be spaced from said path.

* * * * *